(12) United States Patent
Tadros et al.

(10) Patent No.: US 10,180,735 B1
(45) Date of Patent: Jan. 15, 2019

(54) NAVIGATION METHODS FOR THREE DIMENSIONAL (3D) MODELS IN MIXED REALITY (MR) ENVIRONMENTS

(71) Applicant: TRIMBLE INC., Sunnyvale, CA (US)

(72) Inventors: Michael Aziz Tadros, Boulder, CO (US); Jeffrey Brian Franklin, Louisville, CO (US)

(73) Assignee: TRIMBLE INC., Sunnyvale, CA (US)

( * ) Notice: Subject to any disclaimer, the term of this patent is extended or adjusted under 35 U.S.C. 154(b) by 22 days.

(21) Appl. No.: 15/637,557

(22) Filed: Jun. 29, 2017

(51) Int. Cl.
| | |
|---|---|
| *G06F 3/01* | (2006.01) |
| *G06K 9/00* | (2006.01) |
| *G06T 7/20* | (2017.01) |
| *G06T 7/30* | (2017.01) |
| *G06T 19/00* | (2011.01) |
| *G06F 3/0346* | (2013.01) |
| *H04N 13/332* | (2018.01) |

(52) U.S. Cl.
CPC ............ *G06F 3/0346* (2013.01); *G06F 3/012* (2013.01); *G06K 9/00624* (2013.01); *G06T 7/20* (2013.01); *G06T 7/30* (2017.01); *G06T 19/006* (2013.01); *H04N 13/332* (2018.05)

(58) Field of Classification Search
None
See application file for complete search history.

(56) References Cited

U.S. PATENT DOCUMENTS

| | | | |
|---|---|---|---|
| 2004/0074173 A1* | 4/2004 | Miller | G06Q 10/06 52/234 |
| 2012/0142415 A1* | 6/2012 | Lindsay | G06T 19/006 463/33 |
| 2013/0222373 A1* | 8/2013 | Weinstein | G06Q 50/16 345/419 |
| 2017/0069122 A1* | 3/2017 | Lee | H04N 5/262 |
| 2017/0160815 A1* | 6/2017 | Glazier | G06F 3/013 |
| 2017/0228922 A1* | 8/2017 | Kaeser | G06F 3/04815 |
| 2017/0269713 A1* | 9/2017 | Marks | A63F 13/335 |
| 2018/0136743 A1* | 5/2018 | Seegmiller | G06F 1/163 |

* cited by examiner

*Primary Examiner* — Jeffrey J Chow
(74) *Attorney, Agent, or Firm* — Marsh Fischmann & Breyfogle LLP; Kent A. Lembke

(57) ABSTRACT

A mixed reality (MR) system that implements navigation methods for 3D models in MR environments. The navigation methods allow a user to navigate themselves about a 3D model (such as an MR environment including one or more buildings/structures) while in an MR environment. The navigation methods include an elevator feature or navigation mode that allows the user to move accurately between "floors" of the 3D model used to provide the MR environment (move to a next upper or lower floor from their present position). The navigation techniques include a jump feature or navigation mode. The jump feature allows the user to move to any point in an MR environment created using a 3D model that they can presently see in the display of the MR environment or a location that may be partially obscured from the user's view.

15 Claims, 6 Drawing Sheets

NAVIGATION METHODS FOR THREE DIMENSIONAL (3D) MODELS IN MIXED REALITY (MR) ENVIRONMENTS

BACKGROUND

1. Field of the Invention

The present invention generally relates to mixed reality (MR) applications and/or augmented reality (AR) applications used to visualize and allow users to navigate through a 3D model of a physical building, building site, or other structure, and, in this description, MR environments are considered to build upon or use AR and virtual reality (VR) tools and technology (or MR may be thought of as a technology that spans VR and AR). More particularly, the present description is directed toward a MR system to allow a user to teleport themselves from their current location in a 3D model (or MR environment) to a new location without having to "walk" a lengthy, circuitous, or even non-existing path between the two locations in the 3D model (or MR environment).

2. Relevant Background

Mixed reality (MR) is the merging of real and virtual worlds to produce new environments and visualizations where physical and digital objects co-exist and interact in real time. MR takes place not only in the physical world or the virtual world, but it is a mix of reality and virtual reality that encompasses both augmented reality (AR) and augmented virtuality (AV) via immersive technology. MR technology interactively blends real world objects with digital content, and MR technology can help users efficiently interpret physical and digital information and the spatial relations between these two types of information. As an exemplary MR technology, the Microsoft Hololens is a headset worn by a user that builds upon holographic computing and advanced sensors and that displays 3D images to the user in the form of holograms while the wearer/user is able to view and move about the surrounding physical world.

Many in the architecture, engineering, and construction (AEC) industry believe that MR will have a significant impact on the AEC industry in the coming years. MR technology addresses some of the industry's inefficiencies during the design, construction, and operation stages. For example, MR technology allows architects and other users to navigate a 3D model (e.g., a building information modeling (BIM) digital representation of physical and functional characteristics of a facility or other physical structure) to allow a planned or existing building/facility to be examined, analyzed, and experienced in an office or remote setting with a mix of physical and digital inputs. MR improves communication, tightens workflow integration, and enables real-time collaboration with collocated and/or remote teams.

In the context of the building industry, MR allows users to span purely virtual and purely real environments such that digital and real content co-exist. For example, architectural design can collide with reality as construction teams work to transform digital content into physical objects. The interpretation of onscreen or printed digital content and its translation to real worlds heavily depends on the user's spatial understanding and their ability to "read" construction documents and computer-aided design (CAD) models. This can be an error-prone process demanding a highly skilled workforce. Interpretation errors are common during the design and construction stages and often result in poorer quality, cost overruns, and schedule delays. Visualizing digital content with MR (e.g., as holograms displayed upon or with physical objects viewed by the user via MR technology) bridges the gap between abstract/virtual and real and reduces current workflow inefficiencies. MR presents the opportunity for an infinite environment in which additional data such as specification and simulation of new structural designs and features can be overlaid onto the real world creating a hyper-reality environment.

The AEC industry is spatial by definition. In the past few years, there has been a transition from two dimensional (2D) documents to 3D models that has improved team communication and coordination. 3D models are common today, but interacting with volumetric data behind a 2D screen is relatively limited. MR, such as that provided via holographic technology and other MR display technologies, can be used to bring the 3D models out of the screen and provide users the ability to engage and interact with the design data in a more intuitive manner. Further, unleashing the 3D model democratizes the data by offering a natural way to experience and understand the design. For example, while years of education and practice may train architects to visualize their designs in 3D, others involved in the building process often have a hard time deciphering the 3D models. Using MR, all those involved in the process can walk around in and experience the designed building/structure in real 3D without the need for an expert to guide them.

As will be appreciated, though, the effectiveness and efficiency of the use of MR in the AEC and other applications is constrained by the ease at which the user of the MR technology (e.g., a wearer of an MR headset such as a Microsoft Hololens or the like) is able to navigate the 3D model in the MR environment (such as a BIM model environment). Presently, a user can navigate through the 3D model by walking in a virtual manner through the environment, e.g., with their avatar/virtual presence taking steps/strides similar to the user in a physical environment on the floors or other horizontal surfaces of the displayed structure defined by the 3D model. However, it can be time consuming and even confusing to try to walk significant distances in the MR environment especially to change elevations (such as to quickly move vertically from one floor of a building to another) or to move from one building to another in a larger modeled facility (such as to move from the terrace of one building to the roof of another nearby building).

Hence, there remains a need for tools to allow a user of MR technology to navigate quickly and effectively about a 3D model environment without requiring the user to walk or otherwise relatively slowly cover long and circuitous paths.

SUMMARY

Briefly, the inventors recognized that it would be desirable to allow a user navigating a 3D model (such as a 3D architectural model, a BIM model, or the like) to move from one location to another location as if teleported to the new location. The navigated environments are labeled mixed reality (MR) environments or displayed 3D model imagery in this description, and this is intended to include virtual reality (VR) and augmented reality (AR) applications and technologies (e.g., the term MR is used in an inclusive manner to include VR and AR). To allow teleportation-type navigation, an MR system is described that implements navigation methods for 3D models in MR environments. These navigation methods allow a user to navigate themselves about a 3D model (such as an MR environment including one or more buildings/structures) while in an MR environment.

The navigation techniques include an elevator feature or navigation mode that allows the user to move accurately between "floors" of the 3D model used in the MR environment (e.g., between two horizontal surfaces that may be adjacent or spaced apart (move to a next upper or lower floor)). The navigation techniques also include a jump feature or navigation mode. The jump feature allows the user to move to any point in an MR environment created using a 3D model that they can presently see in the display of the MR environment or, in some cases, to locations or points nearby to locations they cannot see. In some cases, the new location is chosen to be a location at or near the point the user "sees" and selects that is well-suited for standing/walking within the MR environment. For example, a user can position themselves on the "floor" of a balcony that they cannot see when they are standing below and looking up at it within the MR environment. In another example, the user can position themselves over by a wall at a point on the floor that may be obscured by a counter or other object that is blocking their view without having to walk around the counter or other object.

More particularly, a system is described that is configured for providing a mixed reality (MR) environment with enhanced user navigation. The system includes a display element (e.g., a tablet with see-through video, a transparent display element/monitor, and so on). The system also includes memory or data storage that stores a three dimensional (3D) model. The system includes a processor running a navigation application and operating the display element to display a first image generated from the 3D model based on a first location (e.g., a first location of a user) within the 3D model. During operation of the system, the navigation application receives a navigation request, and, in response, the navigation application processes the 3D model using the navigation request to calculate a second location within the 3D model that differs from the first location. Then, the processor operates the display element to display a second image generated from the 3D model based on the second location (e.g., a second location of the user) within the 3D model so as to teleport the user within the 3D model from the first location to the second location.

In some embodiments, the navigation request includes a user-selected surface in the first image and a jump trigger, and the navigation application calculates the second user location based on the user-selected surface. In such embodiments, the user-selected surface may be a horizontal surface. Then, the navigation request may further include a user-selected location on the horizontal surface, and the navigation application may position feet of the user in the 3D model at the user-selected location. Further, the navigation application may move an eye location of the user in the 3D model to a vertical offset (e.g., the eye height setting) above the user-selected location, and the second image may be generated by the processor based on the eye location.

In some cases, the user-selected surface may be a vertical surface. In such cases, the navigation request further includes a user-selected location on the vertical surface (e.g., coordinates within the 3D model associated with the location of a cursor/pointer in the UI or the like). Then, the navigation application may identify a horizontal surface in the 3D model that intersects or may be nearby/transverse to the vertical surface, and the navigation application selects a set of coordinates in the horizontal surface to define the second location in the 3D model. In some embodiments, the navigation application identifies the horizontal surface by determining which direction the vertical surface faces in the 3D model, by extending a first line horizontally and orthogonally outward from the user-selected location an offset distance, and by extending a second line from the outer end of the first line vertically downward until the second line intersects a horizontal surface at the second location. Next, the navigation application positions feet of the user in the 3D model at the second location, the navigation application moves an eye location of the user in the 3D model to a vertical offset above the user-selected location. The processor then generates the second image based on the new eye location.

In the same or other implementations, the navigation request may include an elevator navigation request along with an upward navigation request or a downward navigation request. In such cases, when the navigation request includes the upward navigation request, the second user location is on a higher horizontal surface above the first user location in the 3D model. In contrast, when the navigation request includes the downward navigation request, the second user location is on a lower horizontal surface below the first user location in the 3D model. The navigation application processes the 3D model using the first user location to identify horizontal surfaces vertically above or below the first user location in the 3D model and to test the identified horizontal surfaces for validity for use as the higher or lower horizontal surface by determining whether a vertical distance to a next higher horizontal surface in the 3D model is greater than a minimum vertical clearance value that is greater than an eye height setting for the user (such as 6 to 12 inches more than the current eye height setting in the MR system).

DETAILED DESCRIPTION

In the following description, methods are taught for more efficiently and quickly navigating a mixed reality (MR) environment that is provided by an MR system (or device) based on a digital 3D model such as an architectural model, a BIM model, or the like. The methods may be implemented using presently available MR devices such as, but not limited to, the Microsoft Hololens, and, hence, the description and following claims are also directed to such devices/systems implementing the enhanced navigation methods.

Briefly, navigation of an MR environment using an MR system may include a jump feature or an elevator feature, and these two new navigation features or modes may be thought of as teleportation navigational tools/elements. The teleportation navigation tools/elements include an elevator feature or navigation mode that allows the user of the MR system to move accurately between "floors" of the 3D model used to produce the MR environment (e.g., between two horizontal surfaces defined by the 3D model that may be adjacent or spaced apart (move to a next upper or lower floor or jump up or down two or more floors from their present position)). The navigation techniques also include a jump feature or navigation mode. The jump feature allows the user of the MR system to move to any point in an MR environment created using a 3D model that they can presently see in the displayed MR environment. In some cases, the new location is chosen to be a location at or near the point the user "sees" and then selects a surface that is well-suited for standing/walking within the MR environment.

Figure 1:
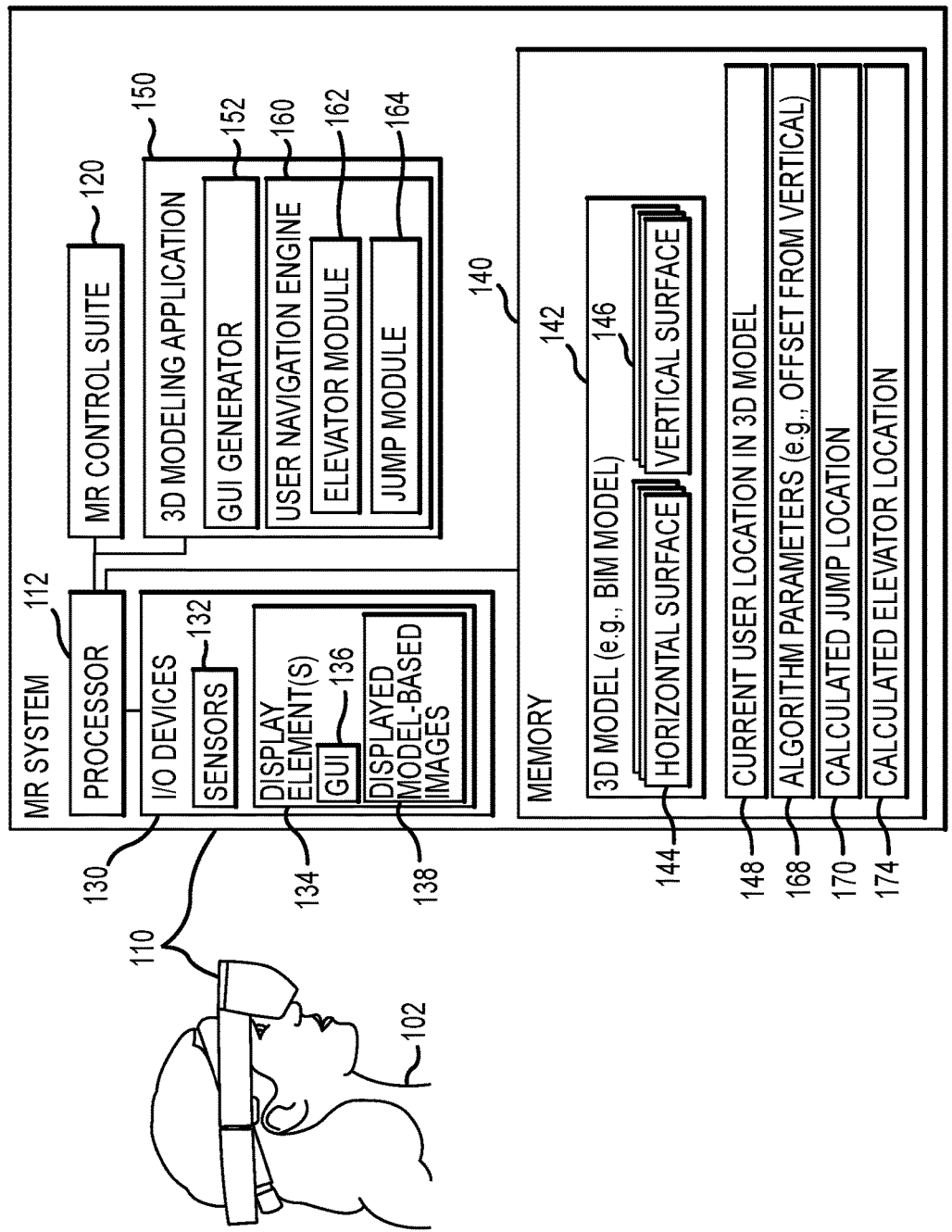
FIG. 1 illustrates a user wearing/using an MR system (e.g., an MR headset) and further illustrates a functional block diagram of an exemplary implementation of such an MR system according to the present description.

FIG. 1 illustrates a user 102 operating or using an MR system (or device) 110 to visualize and explore an MR environment by navigating the MR environment according to the present description and new navigation techniques. FIG. 1 illustrates both one useful physical implementation of the MR system 110 in the form of a headset MR device and a functional block diagram of such an MR device (with the functional block description applying to other particular MR system implementations and is not limited to the illustrated headset MR device).

As shown, the MR system 110 may take the form of a headset such as the Microsoft Hololens or the like. The headset may include built-in sensors that allow the user 102 to use their line-of-sight or gaze to move a cursor (or other selection device in a displayed graphical user interface (GUI) in the headset) to interact with displayed portions/images of an MR environment. The built-in sensors may also allow the user 102 to use gestures made by their hands (such as pointing or a thumb-forefinger pinch) to interact with the MR environment (e.g., to select apps, drag and drop images/holograms, and so on in the MR environment or its displayed images). In other embodiments (not shown but as may be implemented using the functional box MR system 110), the headset may be replaced with other display technologies such as a heads-up display, a handheld device (such as a mobile phone, a handheld PC, tablet, or the like, and so on), a desktop computer display, and an MR-dedicated space (such as the Cave Automatic Virtual Environment), as each of these MR technologies may be used to provide an MR environment based on a digital 3D model that may be navigated by the user of the MR technology. Many of these MR technologies include a display element (e.g., display element 134 in FIG. 1) that is or includes a transparent display element/monitor that allows the user 102 to concurrently see displayed information (e.g., a GUI, 3D or 2D imagery from a digital model, and so on) and their surrounding environment. Others, such as tablets, may provide video see-through rather than a transparent display.

Turning now to the functional block diagram of the MR system 110, the system 110 includes a processor(s) 112 that manages hardware components such as memory 140 and I/O devices 130 and also executes code/software/programs/applications to provide the MR system functionality. Particularly, the MR system 110 includes software in the form of an MR control suite 120 that functions to process a digital 3D model 142 (such as a BIM model or the like) to generate imagery (e.g., 3D images) 138 that is displayed on a display element 134 for viewing by the user 102 concurrently with their surrounding physical environment (except in VR implementations) often concurrently with a GUI 136 (generated by the MR control suite 120 and/or by the GUI generator 152 of the 3D modeling application 150).

The I/O devices 132 may include gesture recognition, tracking components (such as for following a user's gaze, and movements (e.g., walking within the MR environment), and the like, and output from these sensors 132 is processed by the MR control suite 120 to determine how to modify the MR environment by selecting differing portions or views (or sizing) of the 3D model 142 to display in the display element 134 to the user 102. The MR control suite 120 also processes the input from the user 102 to determine a current user location 148 in the 3D model 142 (or relative to the 3D model 142), and this location 148 is used by the MR control suite 120 along with the sensed user gaze/line of sight to provide the displayed model-based images 138 in the display element 134 based on data in the 3D model 142. Typically, the I/O devices 130 such as sensors 132 are used by the MR control suite 120 to sense user input from user 102, and this input may be determined to be a selection of a portion of a displayed GUI 136 (e.g., a selection of a drop down menu item or other trigger element to select initiation of an app or an operating mode/feature such as the navigation modes described herein) and/or to select a portion of the displayed images from the 3D model (e.g., to select a jump-to-oint/location when in the jump navigation mode discussed below).

The processor 112 further runs software or executes code (in memory 140) to provide functions of a 3D modeling application 150 during operations of the MR system 110. The 3D modeling application 150 includes a GUI generator 152 (or may include a subroutine that collaborates with GUI generator of the control suite 120 in some implementations), and the GUI generator 152 is used to update the GUI 136 displayed by the display elements 134 with the model images 138. This GUI 136 is used to provide menu elements for use by the user 102 to navigate an MR environment that includes the model-based images 138 by choosing navigating modes/features such as a conventional walk navigation mode/feature, which may be provided by the user navigation engine 160, allowing the user to walk through the MR environment to explore concurrently the physical environment augmented with the displayed images 138.

More significantly to the present description, the user navigation engine 160 includes two additional, non-conventional navigation modes that allow the user 102 to be teleported from their current user location 148 to a new location (from a first to a second location) in the MR environment (or new location in the displayed images 138 created based on the 3D model (or, stated differently, to a new location within the 3D model 142 being used to provide the MR environment)). Particularly, the user navigation engine 160 includes an elevator module 162 and a jump module 164 to provide the teleportation-like navigational features of the MR system 110 to the user 102.

Briefly, the jump module 164 can be chosen/selected by the user 102 in the GUI 136 to initiate this mode of navigation in the MR environment (or to a new location in the 3D model used to display the images 138 by the control suite 120). Then, the user 102 may select a jump location in the displayed model-based image 138 (e.g., a new location in the 3D model), and this is a location that they can presently "see" based on their current location 148 combined with their current line of sight/gaze as determined by the MR control suite 120 based on output of one or more of the sensors 132 (as this determines what is provided to the user in the displayed images 138 via the display element 134).

The jump module 164 processes the user's input jump location (e.g., an X, Y, and Z coordinate within the 3D model 142) to identify a nearby (e.g., nearest in some cases) vertical surface 146 defined in the 3D model 142. Note, for this description, X and Y are horizontal coordinates and Z is an elevation or height coordinate. Some embodiments and systems may use X and Z for horizontal and Y for vertical. Also, in some rotated or arbitrary coordinate systems, "up" can be a combination of X, Y, and Z coordinates and not just one component as described herein for ease in explanation of features of the navigation process. The jump module 164 may then identify an adjacent, connecting, or other nearby horizontal surface 144 defined in the 3D model 142 using this vertical surface 146, and the jump module 164 may select/calculate the jump location 172 (new or second location for the user 102 in the MR environment or in the 3D model 142) on this horizontal surface (such as a location for the user's feet or as an offset from the user's eyes (where the gaze or line of sight for the user 102 in the MR environment is located by the MR control suite 120 in generating the images 138)). If the user's input jump location is on a proper horizontal surface for standing, the jump module 164 may simply choose this horizontal surface and identify the location on this surface associated with the user's input jump location.

A set of algorithm parameters 168 may be defined and stored in memory 140 for use by the jump module 164 (and elevator module 162), and these parameters 168 may include this vertical offset from the user's foot location to the user's eye or viewing location. The parameters 168 may also include a horizontal offset (e.g., 1 to 3 feet with 2 feet being used in some cases) from the vertical surface chosen by the user (selected jump location) or from the vertical surface 146 chosen by the jump module 164 based on the user's jump location input/selection in the 3D model (or in the displayed model-based image 138 of the display element 134). The user navigation engine 160 provides the calculated jump location 170 (e.g., X-Y-Z coordinates in the 3D model 142) to the MR control suite 120 for use as the new current user location 148, and the MR control suite 120 modifies the displayed model-based images 138 to reflect the new location of the user 102 within the MR environment (based on the currently sensed gaze/line-of-sight of the user 102).

The elevator module 162 can be initiated by the user 102 selecting (via user input to the I/O devices 130) a drop down or other button in the GUI 136 provided by the GUI generator 152. Once selected, the user 102 is able to select or input via I/O devices 130 whether they want to be elevated up or down (and, in some implementations, whether they want to be elevated up/down by 2 or more "floors" rather than just a default one floor at a time). Briefly, the elevator module 162 acts to retrieve the user's current location 148 in the 3D model 142 and, with this information, to identify a current horizontal surface 144 upon which the user 102 is "standing" within the MR environment.

The elevator module 162 then acts to locate an appropriate horizontal surface 174 in the set of defined horizontal surfaces 144. This calculated/selected surface 144 typically will be a horizontal surface 144 directly above or below the current location 148. The elevator module 162 may use one or more parameters 168 to determine a best fit for this next horizontal surface 144. For example, the elevator module 162 may discard a horizontal surface 144 above or below the current surface 144 when there is not an adequate vertical offset to a next one of the horizontal surfaces 144 above the chosen surface 144, with the vertical offset typically being chosen to provide a predefined clearance about the user's head 102 when their feet are located on the horizontal surface as this would indicate that the new surface is not a floor, deck, rooftop, or other proper horizontal surface for the user 102 (or their virtual counterpart) to stand within the MR environment (e.g., the horizontal surface may be a portion of a ceiling, may be a desktop or other furniture, or the like).

Once a proper horizontal surface 144 is identified by the elevator module 162, the module 162 may calculate a proper elevator location (new/second location) 174 (e.g., X-Y-Z coordinates in the 3D model) for the user 102, and this may be a location for the user's feet on the chosen/identified horizontal surface 144 above or below the horizontal surface containing the current user location 148 of the user 102. The module 162 may then pass this location 174 to the MR control suite 120 for use as the new current user location 148, and the control suite 120 may then update the displayed model-based images 138 to reflect this new location for the user 102 (as well as their sensed gaze/line-of-sight).

Figure 2:
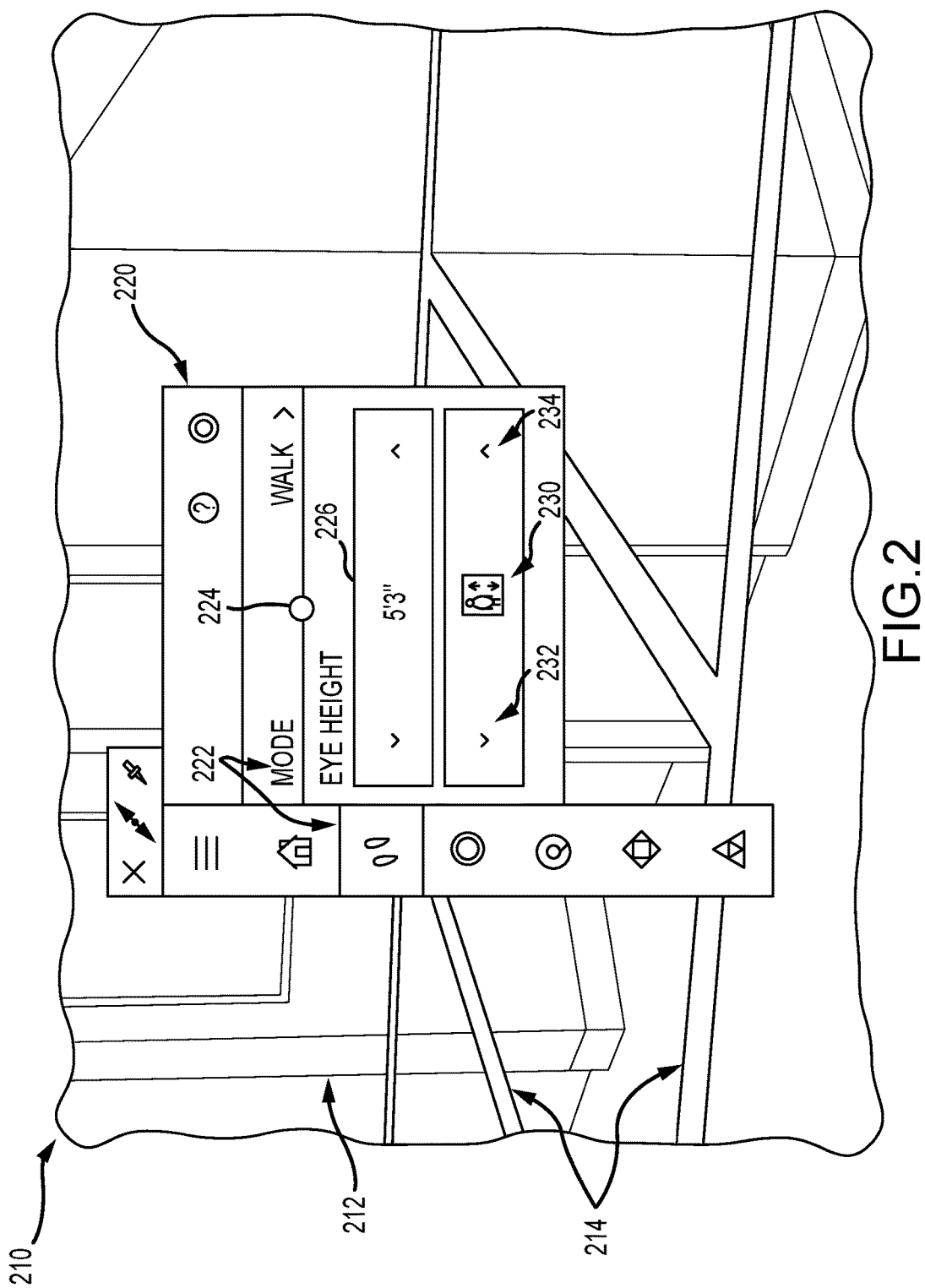
FIG. 2 is a screen shot from an MR display element of an MR system (e.g., the MR system of FIG. 1) while the MR system is operated to provide a navigation GUI including a selectable elevator navigation mode.

FIG. 2 is a screen shot 210 from an MR display element of an MR system (e.g., the MR system 110 of FIG. 1). The screen shot 210 was taken while the MR system is being operated to provide/display a navigation GUI 220 including a selectable elevator navigation mode 230. As shown in screen shot 210, the user is able to observe features of the surrounding physical or real world environment as shown at 212 (with a door/wall of the environment) such as through a transparent display element or a see-through video provided on the display element. Concurrently, images 214 from a 3D model are displayed on the display element or are overlain upon the physical world elements 212.

Additionally, a GUI generator is operating within the MR system to generate and/or display a navigation UI 220. The UI 220 indicates that the user navigation engine is presently operating in a walk mode as shown with text and symbols on a button as shown at 222. Further, the UI 220 indicates at drop down menu item/button 226 that the present setting for an eye height parameter is 5 feet and 3 inches above the ground, floor, or other horizontal surface in the MR environment, and the user may adjust this setting to better suit their height. The user is providing input to locate a cursor/pointer 224 within the UI 220, which can be used to choose a navigation mode within the navigation UI 220.

Particularly, the navigation UI 220 includes a drop down menu item/button 230 that corresponds to initiation of elevator navigation mode (as indicated by the elevator-like icon shown in FIG. 2). In this example, the user may move the cursor 224 to either the down arrow 232 or the up arrow 234 of item/button 230 to initiate elevator navigation mode. Particularly, when the user chooses button 230 at down arrow 232, the elevator module is initiated and responds by determining a proper horizontal surface relative to the horizontal surface of the current user location within a 3D model (or within an MR environment being created based on a digital 3D model) and with this surface calculating a new location to teleport the user to in the 3D model. The MR environment is then modified by the MR controller/control suite by changing the displayed images 214 to correspond with portions of the 3D model associated with the new user location (e.g., the new floor that is one floor below the user's current floor). Similarly, when the user chooses button 230 at up arrow 234, the elevator module is initiated and acts to determine a horizontal surface above (with a greater Z coordinate or greater elevation (note, some coordinate systems may use Y for the elevation)) the current location which satisfies other algorithm parameters (such as minimum distance to next horizontal surface above the chosen horizontal surface to provide a predefined clearance above the user's head when they are "standing" in the MR environment).

Figure 3:
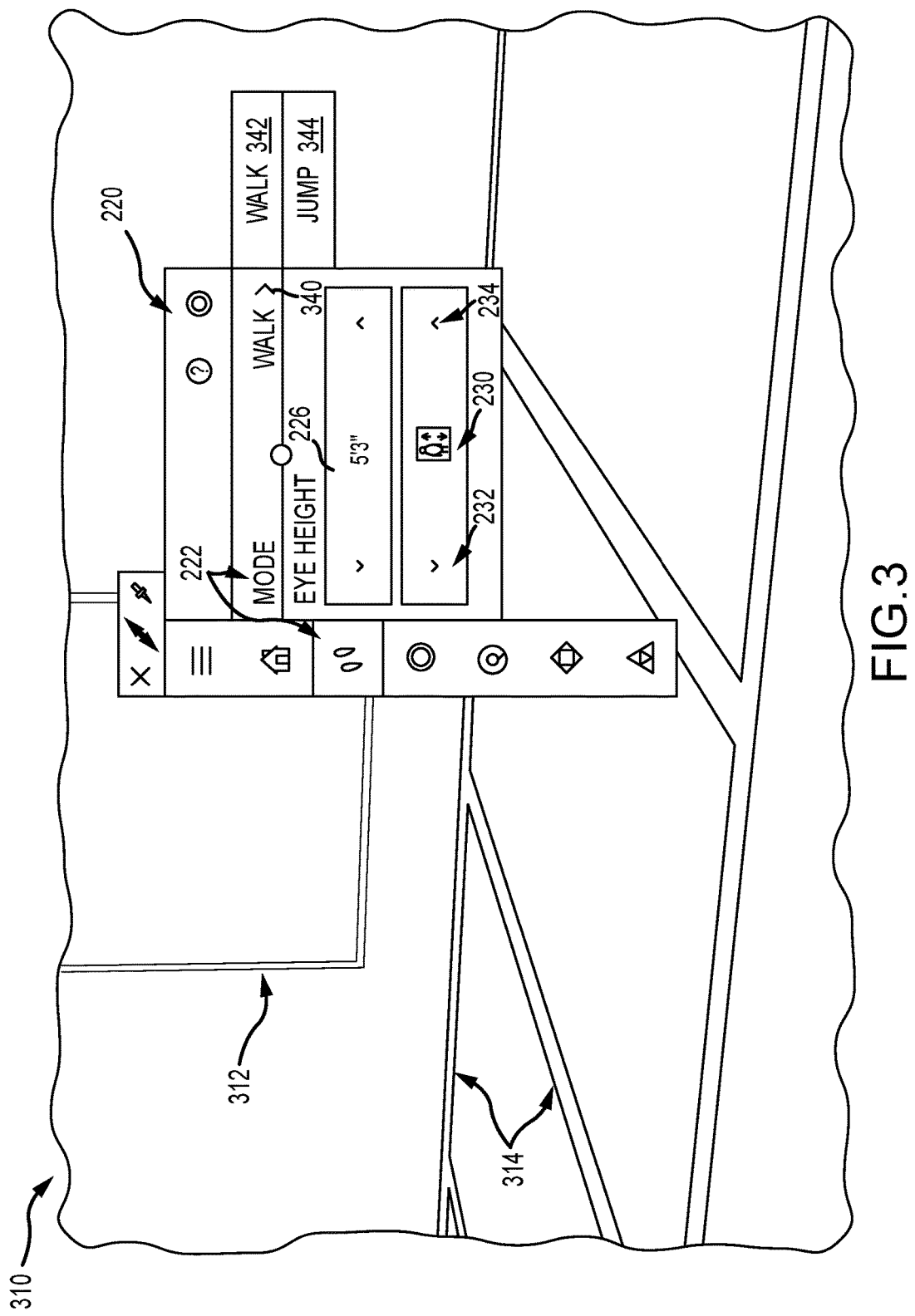
FIG. 3 is a screen shot similar to that of FIG. 2 showing the MR system operating to provide the navigation GUI to choose between a walk navigation mode and a jump navigation mode (or submode)

FIG. 3 is a screen shot 310 similar to that of FIG. 2 showing the MR system operating to provide the navigation GUI 220 while showing the viewed physical elements of the MR environment at 312 and the displayed images of the MR environment at 314. In the screen shot 310, the MR system is operating in response to a user's selection (such as by movement of a cursor via gestures or other sensed/tracked input to choose the arrow/icon 340. This selection causes the GUI generator to display the two navigation choices of a walk mode (selectable button 342) or a jump mode (selectable button 344).

Figure 4:
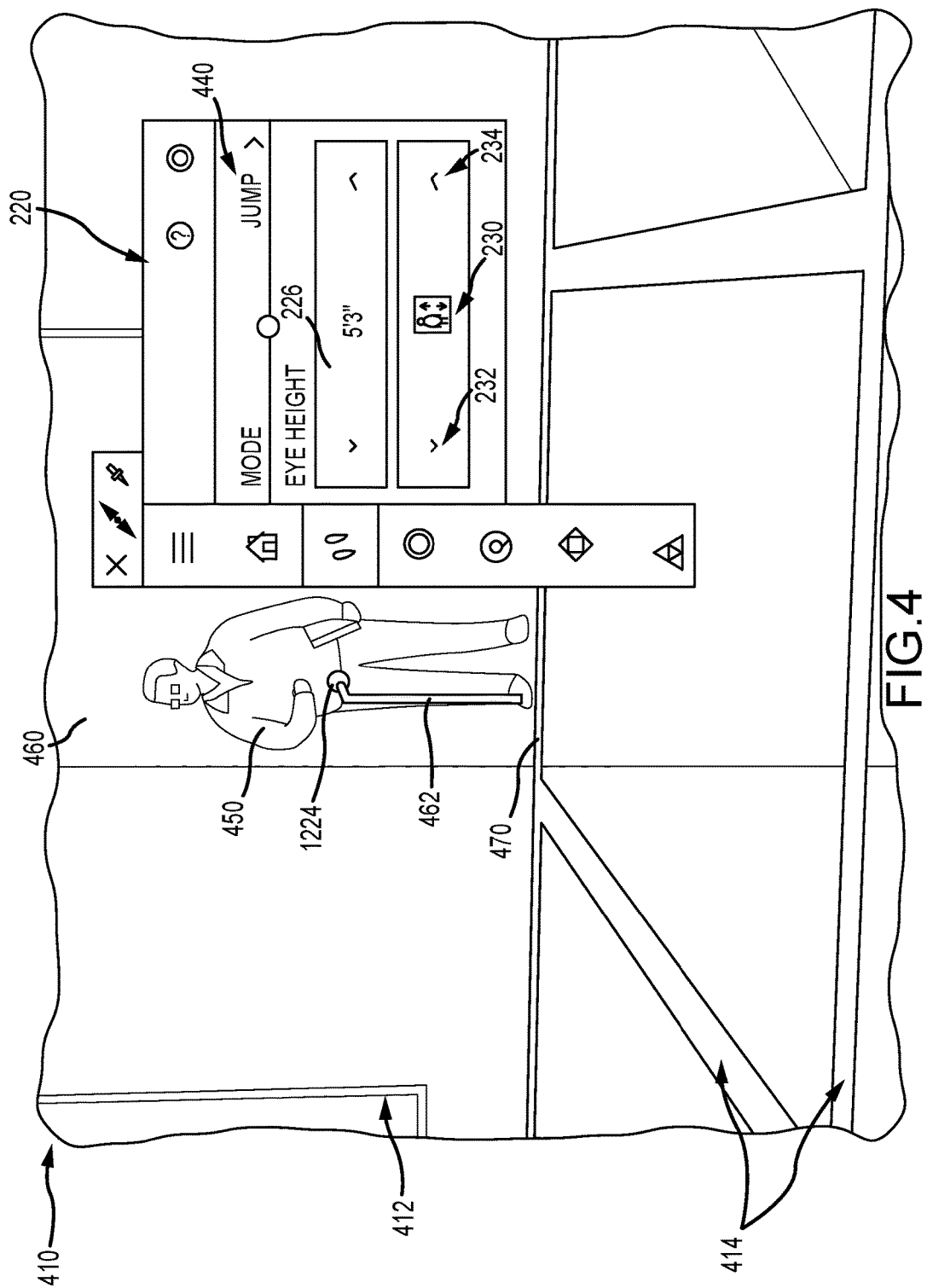
FIG. 4 is a screen shot showing a user's view of an MR environment via the MR system of FIG. 3 upon selection of a vertical surface by a user and triggering of a jump navigation action.

FIG. 4 provides a screen shot 410 showing what a user of the MR system observes of the MR environment after the user has selected the jump navigation mode as indicated by display of the text 440 in the updated navigation UI 220. The user is able to see the physical environment/elements as shown at 412 with overlain/displayed images 414 from the 3D model as well as the UI 220. Further, with the MR system in the jump mode, the user is able to locate the cursor 224 on nearby location in the MR environment, and the jump navigation module acts to locate the nearest vertical surface 460 in the MR environment. For example, the cursor 224 may be positioned upon a displayed vertical surface from the 3D model being used by the 3D modeling application to provide the MR environment with the MR system.

The user navigation engine may then use its jump module to locate a horizontal surface 470 that is proximate to this vertical surface (e.g., to the user-selected jump location (cursor location)) and, typically, below the elevation of the user-selected jump location. The jump location is then calculated as shown with lines 462 as being horizontally offset orthogonally from the vertical surface (such as by 2 feet or the like) and then extending downward from the user-selected/input jump location and parallel to the chosen vertical surface to intersect with the horizontal surface 470. If the user places the cursor 224 on a proper horizontal surface for jump operations (such as surface 470), the jump module may simply select this surface 470 as the chosen horizontal surface and determine the proper coordinates for the user's feet on this surface as the jump location (new current location in the 3D model for the user). Optionally, a representation of the user 450 may be generated and displayed by the display element of the MR system to allow the user to visualize where they will be jumped to in this jump action (e.g., the jump operation may require the user to first select a proposed jump location and then accept the new location prior to the user being teleported to the calculated jump location and the displayed user image 450 may assist in this determination of whether or not to accept the jump).

The MR controller or control suite accepts the jump location as the new current location for the user, and these X-Y-Z coordinates are used to place the user's feet on the horizontal surface 470 with their eyes vertically above this spot at the predefined eye height 226 and with the images displayed from the 3D model being chosen to suit the user's current gaze/line-of-sight as sensed by the MR system. The jump module is configured to allow a user to jump to new locations even when they cannot "see" a horizontal surface because they can select a vertical surface that they can see and the jump module will locate the nearest appropriate horizontal surface for the user (e.g., typically the next lowest horizontal surface defined for the 3D model that intersects the vertical surface and is at a lower elevation than the chosen location on the vertical surface (below the current cursor location in the MR environment).

Figure 5:
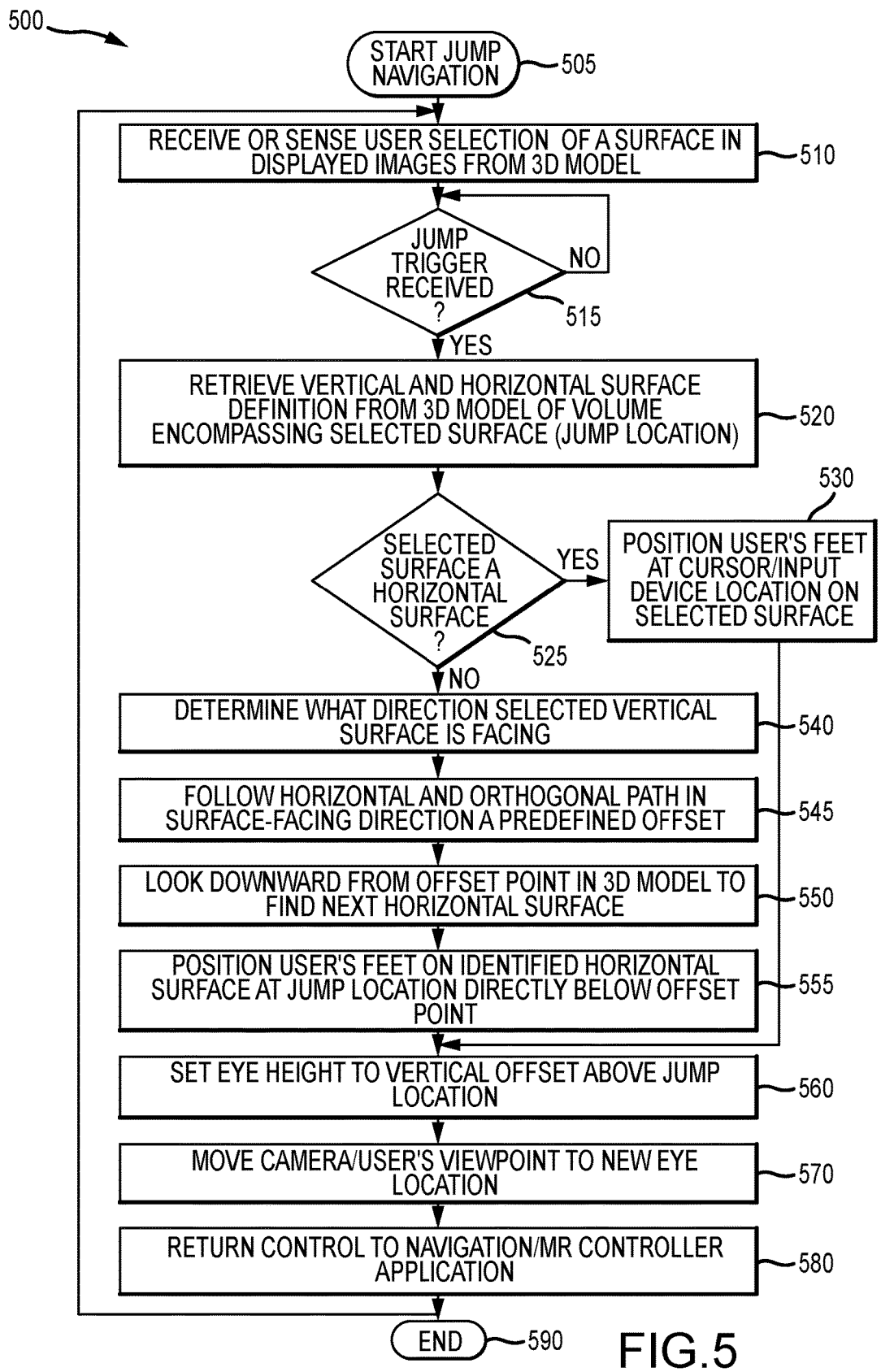
FIG. 5 is a flow diagram of a method/algorithm for performing a jump navigation action as may be performed by the jump module of the MR system of FIG. 1.

FIG. 5 is a flow diagram 500 of a method/algorithm for performing a jump navigation action as may be performed by the jump module 164 of the MR system 110 of FIG. 1. The method 500 starts at 505 such as with providing a user navigation engine with an elevator module and a jump module (such as modules 162 and 164 in FIG. 1) in an MR system, and step 505 may also include initiating operations of the MR system that includes the jump and elevator modules for a particular user. The user may start an MR experience with the MR system by choosing a particular 3D model from local MR system memory (or from a memory device accessible the by the MR system) and enter a space suited for such a 3D model (and/or by registering the chosen model to the local physical space). As part of step 505, the user navigation engine or 3D modeling application may operate to generate and display a navigation UI to the user via a display element (e.g., a display in a worn headset or the like), and this navigation UI typically allows the user to select and then trigger operations of the jump navigation module. Further, in step 505, the user may provide input that is received by the MR system that indicates the user wishes to navigate the MR environment in a jump navigation mode such as by interacting with the displayed navigation UI.

The method 500 of FIG. 5 continues at 510 with the MR system detecting/sensing or receiving a user input that indicates they have selected a surface in the displayed images from a 3D model (e.g., a surface of the 3D model). This may involve the user directing their gaze in a particular direction and/or performing a particular gesture that is recognized as a surface selection by the MR system. Then, at step 515, the jump navigation method 500 includes determining whether or not a jump trigger or initiation input has been received by the MR system from the MR system user/operator. If not, the method 500 continues at 515 (or step 510) until a jump trigger is received.

When a jump trigger is received at 515, the method 500 continues at step 520 with retrieving data from the 3D model being used by the MR system to create the MR experience (e.g., to provide images overlain upon views of the physical environment). Particularly, the data retrieved from memory at 520 may include the definitions of vertical surfaces and horizontal surfaces in a predefined volume about the location of the user selection in the 3D model (e.g., the user's selection (or user input jump location) may define an X-Y-Z coordinate on a particular surface and definitions of the geometry of the surrounding volume of the 3D model may be retrieved at step 520). In some preferred implementations, at step 520, the entire 3D model is searched along the direction of the selection to find a selected surface(s) (not just a predefined volume or surrounding volume).

Then, at step 525, the method 500 continues with a determination (such as by the jump module 164 of system 110 of FIG. 1) of whether the user input jump location coincides with a point on a horizontal or vertical surface. If the user's input provides a selection of a horizontal surface in the 3D model, the method 500 continues at 530 with positioning the user's feet (e.g., the virtual feet of the virtual user/operator moving in the MR environment created by the MR system) at the cursor/input device location on the selected surface of the 3D model. The method 500 then continues at 560.

If, however, the selected surface is a vertical surface, the method 500 continues at 540 with determining which direction the selected vertical surface is facing within the 3D model. Then, at 545, the method 500 continues with following a horizontal path outward from the selected vertical surface from the user input jump location (e.g., an X-Y-Z coordinate) a predefined horizontal offset distance (such as a distance in the range of 1 to 3 feet with 2 feet used in some embodiments). The horizontal path is typically orthogonal to the vertical surface. Next, at step 550, the method 500 continues with following the path from the current offset location downward in the 3D model (to a lower elevation in the 3D model) until a defined horizontal surface of the 3D model is intersected. This step may be thought of as looking downward in the 3D model from the point that is offset horizontally from the selected point on the vertical surface to see or find a horizontal surface.

Then, at 555, the method 500 continues with the jump module acting to position the user's feet on the horizontal surface identified in step 550 at the intersection point (between the searching or extended path and the horizontal surface), and this position may be considered the calculated jump location in the 3D model chosen based on the received user selection of a surface (or of a jump location or point on such a surface) from step 510. The jump module then acts at 560 to set the eye height for the user to a predefined vertical offset from the calculated jump location on the horizontal surface (e.g., in the examples above the eye height was set at 5 feet and 3 inches). The method 500 then continues at 570 with moving the camera and/or user's viewpoint in the MR environment to the new eye location. At 580, the jump module returns control to the navigation engine, the 3D modeling application, or the MR control suite for continued generation of the MR environment such as by updating the displayed images from the 3D model to reflect the transportation of the user to the jump location in the 3D model (and to reflect the current gaze direction of the user). The method 500 may end at 590 (and effectively be waiting for 510/515 to be triggered by the application).

Figure 6:
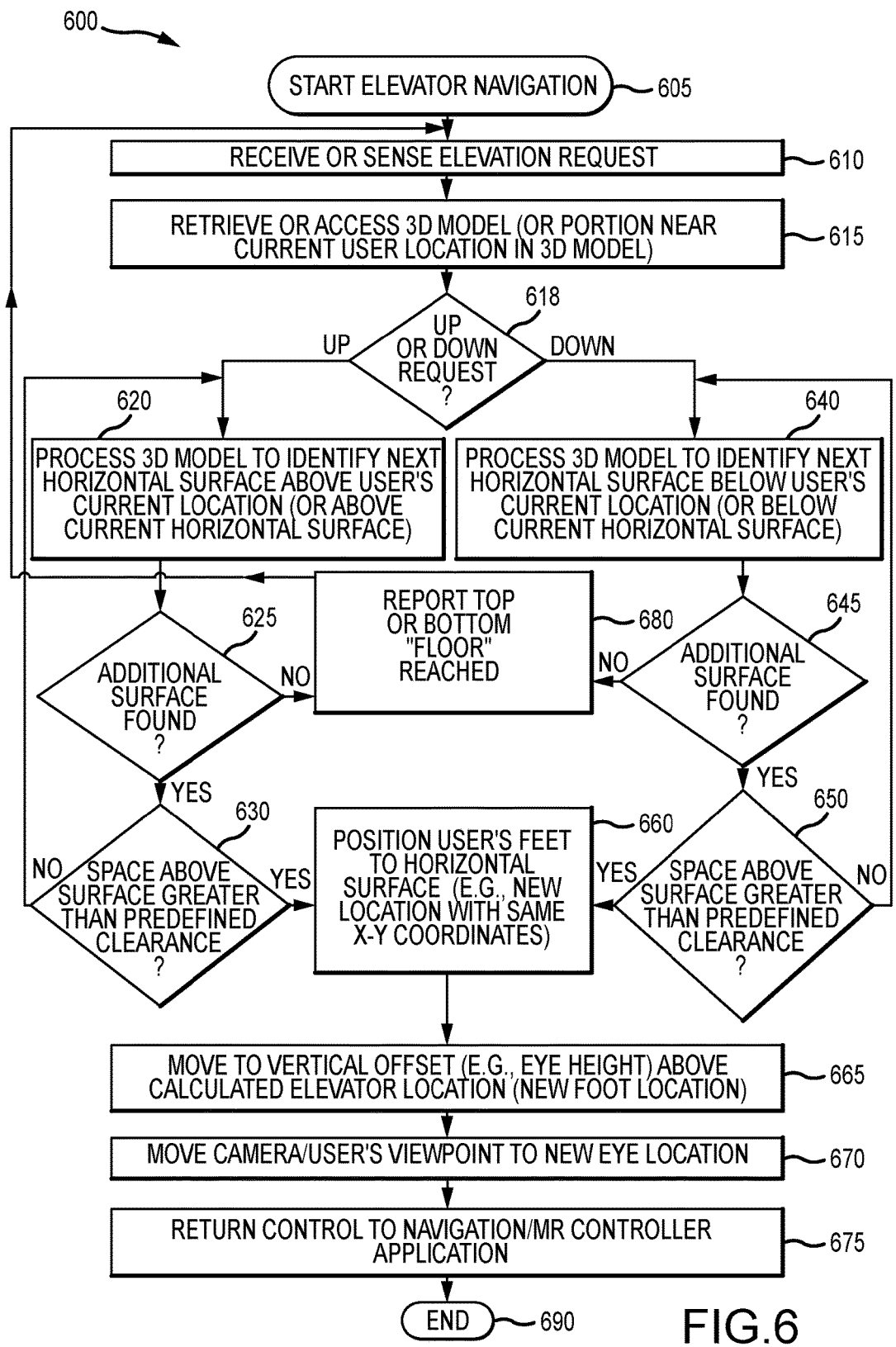
FIG. 6 is a flow diagram of a method/algorithm for performing an elevator navigation action as may be performed by the elevator module of the MR system of FIG. 1.

FIG. 6 is a flow diagram of a method/algorithm 600 for performing an elevator navigation action as may be performed by the elevator module 162 of the MR system 110 of FIG. 1. The method 600 starts at 605 such as with providing a user navigation engine with an elevator module (such as module 162 in FIG. 1) in an MR system, and step 605 may also include initiating operations of the MR system that includes the elevator module for a particular user. The user may start an MR experience with the MR system by choosing a particular 3D model from local MR system memory (or from a memory device accessible the by the MR system) and enter a space suited for such a 3D model (and/or by registering the chosen model to the local physical space). As part of step 605, the user navigation engine or 3D modeling application may operate to generate and display a navigation UI to the user via a display element (e.g., a display in a worn headset or the like), and this navigation UI typically allows the user to select/trigger operations of the elevator navigation module.

In step 610, the MR system detects/senses or receives a user input that they desire to be elevated/moved to a new horizontal surface in the 3D model. For example, the user may be exploring a floor of a multi-story building and wish to be transported up or down to a new floor without having to walk or otherwise slowly navigate to the new/second location. The user's input may be provided by selecting an elevator button with an indication of whether the user wishes to move up or down within the 3D model (such as by selecting the up or down arrow of the elevator button 230 shown in FIG. 2). The method 600 continues at 615 with the MR system retrieving or accessing the 3D model (or at least a volume or portion about the user's current location within the 3D model but, in some cases, this step may not be performed since the entire model may be searched up or down (not just some predefined volume around the user (e.g., if the next horizontal surface is 2000 feet above the user the process will still consider this the next horizontal surface)) so as to identify the set of horizontal surfaces above and below the user's current location (e.g., all surfaces with or containing the X-Y coordinates (i.e., horizontal coordinates or same coordinates without regards to elevation) of the user's location (e.g., their foot location), and it should be understood that some coordinate systems have X-Z as the horizontal coordinates).

The method 600 continues at 618 with the MR system (e.g., the elevator module) determining whether the user has selected to move up or down in the 3D model (or the MR environment created based on the 3D model's digital data) with elevator-based navigation. If up is chosen by the user, the method 600 continues at 620 with processing the 3D model (retrieved/accessed in step 615) to identify a next horizontal surface above (with a greater elevation or Z coordinate value (or other systems may use the Y coordinate value for elevation)) the user's current location (or above the current horizontal surface where the user's feet are placed or that is being processed by the elevator module). At step 625, the elevator module determines whether or not a horizontal surface is available for processing (e.g., for consideration for providing a new location for the user). If not, the method 600 continues at 680 with reporting to the user (such as with a message or icon/image indicating) that they are already on the uppermost floor/surface of the 3D model. This may be determined by the elevator module searching the model and finding no surfaces above the current X-Y coordinates with a greater elevation (greater Z value) or by the elevator module looking upward and finding the distance to the next surface is infinite, which would indicate the user's feet are presently on the roof, on an upper balcony, in an open space, or the like of the 3D model.

If a next higher horizontal surface is identified in step 620, the up elevator navigation of method 600 continues at 630 with determining whether a set of predefined conditions are satisfied such that the identified horizontal surface can be used as a valid surface onto which the user can be moved in the MR environment. The conditions for validity may include determining whether the space between the identified horizontal surface and a next higher horizontal surface above the identified horizontal surface is greater than a predefined value. This test can be used to determine whether or not the horizontal surface is a floor, a rooftop, or similar surface upon which a user can stand within the MR environment or whether the surface is actually a different type of horizontal surface such as a layer of subflooring or the like upon which a user would typically not stand in the MR environment. The predefined value may be set equal to the present setting for eye height (e.g., 5 feet and 3 inches or another useful value) plus some added amount to provide clearance for the user's head (or for the user's virtual head within the MR environment), such as 6 to 12 inches, when the user is positioned upon this horizontal surface. If the spacing is not adequate or the conditions for validating a surface are not met, step 620 may be repeated to identify a next higher horizontal surface above the presently identified surface.

If, at 630, the elevator module determines that the test conditions are met (e.g., there is adequate space for the user's avatar to be placed on this surface in the 3D model), the method 600 continues at 660 with positioning the user's feet on the identified horizontal surface. The calculated elevator location (or new/second location) may be defined by a set of coordinates that define a particular horizontal location in the 3D model combined with a new vertical location or new elevation (e.g., same X-Y coordinates but new Z coordinate) such that the user is moved directly upward within the 3D model from their current/first location. Then, in step 665, a new eye position is determined with a vertical offset (the eye height setting) from the feet location (or calculated elevator location). In step 670, the camera or user's viewpoint is moved to the new eye location in the 3D model, and, in step 675, control is returned to the navigation application or MR controller application. The method then ends at 690.

If, at 618, the elevator module determines that the user has chosen to be teleported downward within the 3D model, the method 600 continues at step 640 with the elevator module processing the 3D model to identify a next horizontal surface below (at a lower or smaller elevation) the current horizontal surface (or current location of the user's feet) in the 3D model. In step 645, the elevator module acts to verify that an additional surface was found, i.e., that the horizontal surface upon which the user is standing in the 3D model is not the lowest valid horizontal surface of the 3D model. If no surface was found, the method 600 continues with reporting to the user (such as via the displayed navigation UI) that they are already standing at the lowest horizontal surface of the 3D model such that a downward elevator navigation is not presently available.

If a lower horizontal surface is found in the 3D model in step 640, the method 600 continues at 650 with the elevator module determining whether the identified horizontal surface satisfies conditions and is a valid horizontal surface for elevator-based navigation. The validity conditions may be designed or chosen to test whether or not the user (or their avatar) can stand upon the surface with adequate clearance above their head. Hence, the elevator module in step 650 may determine a vertical distance between the identified horizontal surface and the next higher horizontal surface in the 3D model (which initially will be the horizontal surface upon which the user is presently standing (the surface that contains the user's current location (or foot location))). The vertical distance can be compared with a predefined value such as the present setting for the eye height plus a clearance value (e.g., a value in the range of 6 to 12 inches or more). If the calculated vertical distance/spacing is less than the predefined test value/condition, the method 600 may continue with step 640 in locating a next lower horizontal surface below the presently identified horizontal surface.

If, at 650, the elevator module determines that the test conditions are met (e.g., there is adequate space for the user's avatar to be placed on this surface in the 3D model), the method 600 continues at 660 with positioning the user's feet on the identified horizontal surface. The calculated elevator location (or new/second location) may be defined by a set of coordinates that define a particular horizontal location in the 3D model combined with a new vertical location or new elevation e.g., same X-Y coordinates but new Z coordinate) such that the user is moved directly downward within the 3D model from their current/first location. Then, in step 665, a new eye position is determined with a vertical offset (the eye height setting) from the feet location (or calculated elevator location). In step 670, the camera or user's viewpoint is moved to the new eye location in the 3D model, and, in step 675, control is returned to the navigation application or MR controller application. The method 600 then ends at 690.

In some implementations of the method 600, the elevator module is adapted to further process horizontal surfaces that fail to satisfy the conditions in steps 630 and 650. For example, the 3D model may include furniture and other obstacles that may include horizontal surfaces that would cause a floor/horizontal surface to be discarded in steps 630, 650 as being invalid due to a lack of space between adjacent horizontal surfaces. In one particular example, a room may include a desk or table and testing in steps 630, 650 of the floor/horizontal surface at a user location immediately below the desk or table will indicate there is not enough space while this same floor/horizontal surface will satisfy the vertical spacing requirements if the user location is moved laterally outward some distance (e.g., to move the user's location (X-Y coordinates) out from under the obstacle (e.g., desk or table)). Hence, some embodiments of the method 600 may include an additional step of retesting horizontal surfaces from one or more additional user's locations (different X-Y coordinates). The additional locations on the horizontal surface may, for example, be chosen to be on circumference of a circle with a radius of 3 to 6 feet or the like or may be chosen in a variety of other ways to practice the method 600.

While this disclosure contains many specifics, these should not be construed as limitations on the scope of the disclosure or of what may be claimed, but rather as descriptions of features specific to particular embodiments of the disclosure. Furthermore, certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

The above described embodiments including the preferred embodiment and the best mode of the invention known to the inventor at the time of filing are given by illustrative examples only.

We claim:

1. A system for providing a mixed reality (MR) environment with enhanced user navigation, comprising:
   a display element;
   memory storing a three dimensional (3D) model; and
   a processor running a navigation application and operating the display element to display a first image generated from the 3D model based on a first user location within the 3D model, wherein the navigation application receives a navigation request, wherein the navigation application processes the 3D model using the navigation request to calculate a second user location within the 3D model that differs from the first user location, wherein the processor operates the display element to display a second image generated from the 3D model based on the second user location within the 3D model, wherein the navigation request includes an elevator navigation request along with an upward navigation request or a downward navigation request, wherein, when the navigation request includes the upward navigation request, the second user location is on a higher horizontal surface above the first user location in the 3D model, wherein, when the navigation request includes the downward navigation request, the second user location is on a lower horizontal surface below the first user location in the 3D model, and wherein the navigation application processes the 3D model using the first user location to identify horizontal surfaces vertically above or below the first user location in the 3D model and to test the identified horizontal surfaces for validity for use as the higher or lower horizontal surface by determining whether a vertical distance to a next higher horizontal surface in the 3D model is greater than a minimum vertical clearance value that is greater than an eye height setting for the user.

2. The system of claim 1, wherein the navigation request includes a user-selected surface in the first image and a jump trigger and wherein the navigation application calculates the second user location based on the user-selected surface.

3. The system of claim 2, wherein the user-selected surface is a horizontal surface, wherein the navigation request further includes a user-selected location on the horizontal surface, wherein the navigation application positions feet of the user in the 3D model at the user-selected location, wherein the navigation application moves an eye location of the user in the 3D model to a vertical offset above the user-selected location, and wherein the second image is generated based on the eye location.

4. The system of claim 2, wherein the user-selected surface is a vertical surface, wherein the navigation request further includes a user-selected location on the vertical surface, wherein the navigation application identifies a horizontal surface in the 3D model that intersects the vertical surface, and wherein the navigation application selects a set of coordinates in the horizontal surface to define the second user location in the 3D model.

5. The system of claim 4, the navigation application identifies the horizontal surface by determining which direction the vertical surface faces in the 3D model, by extending a first line horizontally and orthogonally outward from the user-selected location an offset distance, and by extending a second line from the outer end of the first line vertically downward until the second line intersects the horizontal surface at the second user location.

6. The system of claim 5, wherein the navigation application positions feet of the user in the 3D model at the second user location, wherein the navigation application moves an eye location of the user in the 3D model to a vertical offset above the user-selected location, and wherein the second image is generated based on the eye location.

7. A method for navigating a 3D model, comprising:
displaying a first image generated using the 3D model; from a user associated with a first user location in the 3D model, receiving a user selection of a first surface in the 3D model, the first surface being part of the first image;

determining whether the first surface is horizontal or vertical;

when the first surface is horizontal based on the determining, determining a second user location on the first surface;

when the first surface is vertical, identifying a second surface that is horizontal and that is transverse to the first surface in the 3D model and defining the second user location using coordinates on the second surface; and displaying a second image generated using the 3D model and the second user location in the 3D model, wherein the identifying of the second surface includes extending a horizontal line orthogonally outward from a user-selected location on the first surface an offset distance and extending a vertical line downward from the outer end of the horizontal line until the vertical line intersects the second surface at the second user location.

8. The method of claim 7, wherein the offset distance is in the range of 1 to 3 feet in the 3D model.

9. The method of claim 7, wherein the identifying of the second surface further includes determining which direction within the 3D model that the first surface faces and wherein the horizontal line is extended in the direction during the extending step.

10. The method of claim 7, wherein the second user location is not visible in the first image.

11. The method of claim 7, further comprising positioning a foot location for the user in the 3D model at the second user location, determining an eye position for the user in the 3D model at a location that is vertically offset from the foot location by an eye height setting, and positioning a camera or viewpoint for the user at the eye position, wherein the camera or the viewpoint for the user are used to generate the second image from the 3D model.

12. A method for navigating through a digital 3D model, comprising:

displaying a first image generated from the digital 3D model from a first user location in the digital 3D model, wherein the first user location is associated with a first horizontal surface in the digital 3D model;

receiving a request to navigate in the digital 3D model in a vertical direction from the first user location;

determining a second horizontal surface in the digital 3D model parallel to and spaced apart from the first horizontal surface;

determining a second user location on the second horizontal surface that is directly above or below the first user location in the digital 3D model; and displaying a second image generated from the digital 3D model from the second user location in the digital 3D model, wherein the vertical direction is upward in the digital 3D model, wherein the determining the second horizontal surface comprises identifying a horizontal surface directly above the first user location in the digital 3D model, and wherein the determining the second horizontal surface further comprises verifying a distance between the identified horizontal surface and a next higher horizontal surface in the digital 3D model is greater than a predefined vertical clearance value.

13. The method of claim 12, wherein the vertical distance is greater than an eye height setting and wherein, prior to the displaying of the second image, the method includes assigning a foot location to the second user location on the second horizontal surface and positioning a camera or user viewpoint at a location vertically offset upward from the second horizontal surface by the eye height setting.

14. The method of claim 12, wherein the vertical direction is downward in the digital 3D model and wherein the determining the second horizontal surface comprises identifying a horizontal surface directly below the first user location in the digital 3D model.

15. The method of claim 14, wherein the determining the second horizontal surface further comprises verifying a distance between the identified horizontal surface and a next higher horizontal surface in the digital 3D model is greater than a predefined vertical clearance value.

* * * * *